(12) United States Patent
Kim et al.

(10) Patent No.: US 8,883,336 B2
(45) Date of Patent: Nov. 11, 2014

(54) BATTERY PACK

(75) Inventors: Myung-Chul Kim, Yongin-si (KR);
In-Hwan Cha, Yongin-si (KR);
Hyun-Ye Lee, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/570,217

(22) Filed: Aug. 8, 2012

(65) Prior Publication Data

US 2013/0130073 A1    May 23, 2013

(30) Foreign Application Priority Data

Nov. 22, 2011    (KR) .................. 10-2011-0122178

(51) Int. Cl.
*H01M 2/10*    (2006.01)
*H01M 10/625*    (2014.01)
*H01M 10/663*    (2014.01)
*H01M 10/6563*    (2014.01)

(52) U.S. Cl.
CPC ........ *H01M 10/5016* (2013.01); *H01M 2/1077* (2013.01); *H01M 2220/20* (2013.01); *Y02E 60/12* (2013.01); *H01M 10/5095* (2013.01); *H01M 10/5067* (2013.01)
USPC ................ 429/99; 429/96; 429/158; 429/159

(58) Field of Classification Search
None
See application file for complete search history.

(56) References Cited

U.S. PATENT DOCUMENTS

| 6,340,877 B1* | 1/2002 | Mita et al. ...................... 320/112 |
| 7,117,966 B2* | 10/2006 | Kohda et al. ................. 180/68.5 |
| 7,919,203 B2* | 4/2011 | Shibuya et al. ................. 429/99 |
| 2003/0082438 A1 | 5/2003 | Kwon |
| 2006/0090492 A1 | 5/2006 | Ahn et al. |
| 2008/0085445 A1* | 4/2008 | Marukawa et al. ............. 429/82 |
| 2010/0167116 A1* | 7/2010 | Okada ........................... 429/158 |
| 2011/0008657 A1 | 1/2011 | Chung et al. |

FOREIGN PATENT DOCUMENTS

| EP | 1 897 739 A1 | 3/2008 |
| EP | 2 368 740 A1 | 9/2011 |
| KR | 10-2006-0036694 | 5/2006 |
| KR | 10-2009-0000307 | 1/2009 |
| KR | 10-2009-0093852 | 9/2009 |

OTHER PUBLICATIONS

European Search Report dated Mar. 22, 2013 for European Patent Application No. 12187560, 5 pages.

* cited by examiner

*Primary Examiner* — Milton I Cano
*Assistant Examiner* — Carmen Lyles-Irving
(74) *Attorney, Agent, or Firm* — Christie, Parker & Hale, LLP

(57) ABSTRACT

A battery pack includes at least one battery module having a plurality of battery cells; and a housing accommodating the at least one battery module and having an inlet port at a first side thereof and discharging port at a second side thereof opposite to the first side, the housing having a bottom surface that has a slope and a first hole at an end of the slope.

12 Claims, 6 Drawing Sheets

BATTERY PACK

CROSS-REFERENCE TO RELATED APPLICATION

This application claims priority to and the benefit of Korean Patent Application No. 10-2011-0122178 filed in the Korean Intellectual Property Office on Nov. 22, 2011, the entire content of which is incorporated herein by reference.

BACKGROUND

1. Field

The invention relates to a battery pack.

2. Description of Related Art

Typically, a battery cell is used as an energy source for a mobile unit, an electrical vehicle, hybrid cars and the like and different types of battery cells may be used depending on a type of an external device to which they are applied.

If a long time-driving and high-power drive such as the electrical vehicle and the hybrid car, which requires high power consumption is necessary in order to maximize output and capacity, a plurality of battery cells are connected electrically to construct a mass battery module.

The battery module may maximize an output voltage or an output current based on the number of the built-in battery In addition, a plurality of battery modules may be electrically connected to assemble a battery pack.

However, the battery pack of high-capacity has a problem that a large amount of heat is generated in the process of the charge/discharge.

For this, a cooling system can be formed at the high output and high capacity battery pack and the cooling system serves to decrease an internal temperature of the battery pack by providing a cooling medium such as air and the like to one side of the battery pack and discharging the air from the other side of a battery pack.

In this case, when a humidity of air flowing into the battery pack is high, water may accumulate in the area, thereby blocking the air flow of an internal portion of the battery pack.

Therefore, if the generated water is not effectively eliminated, the problem rises that a short may be generated within the battery pack.

SUMMARY

The present invention provides a battery pack wherein water generated by air having high humidity flown in the inner portion of the battery pack is easily discharged through a first hole formed at a slope portion of an lower housing and an end of a slope.

A battery pack according to an embodiment of the present invention includes at least one battery module including a plurality of battery cells; and a housing accommodating the at least one battery module and having an inlet port at a first side thereof and discharging port at a second side thereof facing the first side, the housing having a bottom surface that has a slope and a first hole at an end of the slope.

In one embodiment, the slope is inclined downwardly from the inlet port to the discharging port and/or the slope portion may be downwardly sloped towards a longitudinal side of the housing. In one embodiment, a cushioning member is located between the bottom surface of the housing and the battery module. The slope and the first hole are formed at the direction from the inlet port to the discharging portion prior to or after the formation of the cushioning member. Further, in one embodiment, the slope extends from a first end of battery module on which the inlet port is formed to a second end of the battery module on which the discharging port is formed.

In one embodiment, the battery pack includes a module supporting portion between the bottom surface and the at least one battery module, and a module fastening hole for fastening the at least one battery module may be formed on the module supporting portion.

In another embodiment, the battery pack includes a module seating portion between the bottom surface of the housing and the at least one battery module, and the module seating portion may have at least one second hole.

In one embodiment, an opening and closing means, such as a valve, is at the first hole. Additionally, the battery pack may include a pressure sensing section for controlling the operation of the opening and closing means at the first hole.

Since water generated by humidity within the battery pack is easily discharged according to the present invention easily, a short in the battery pack may be prevented, thereby improving battery safety.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE EMBODIMENTS

Figure 1:
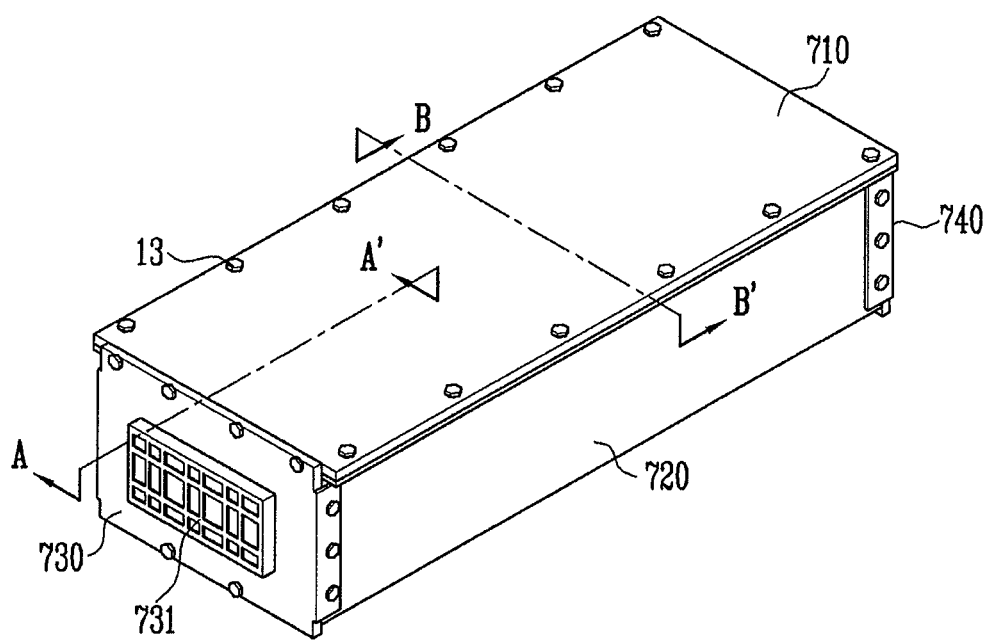
FIG. 1. is a perspective view showing a battery pack according to a first embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to another element or be indirectly connected to the another element with one or more intervening elements interposed therebetween. Hereinafter, like reference numerals refer to like elements.

Figure 2:
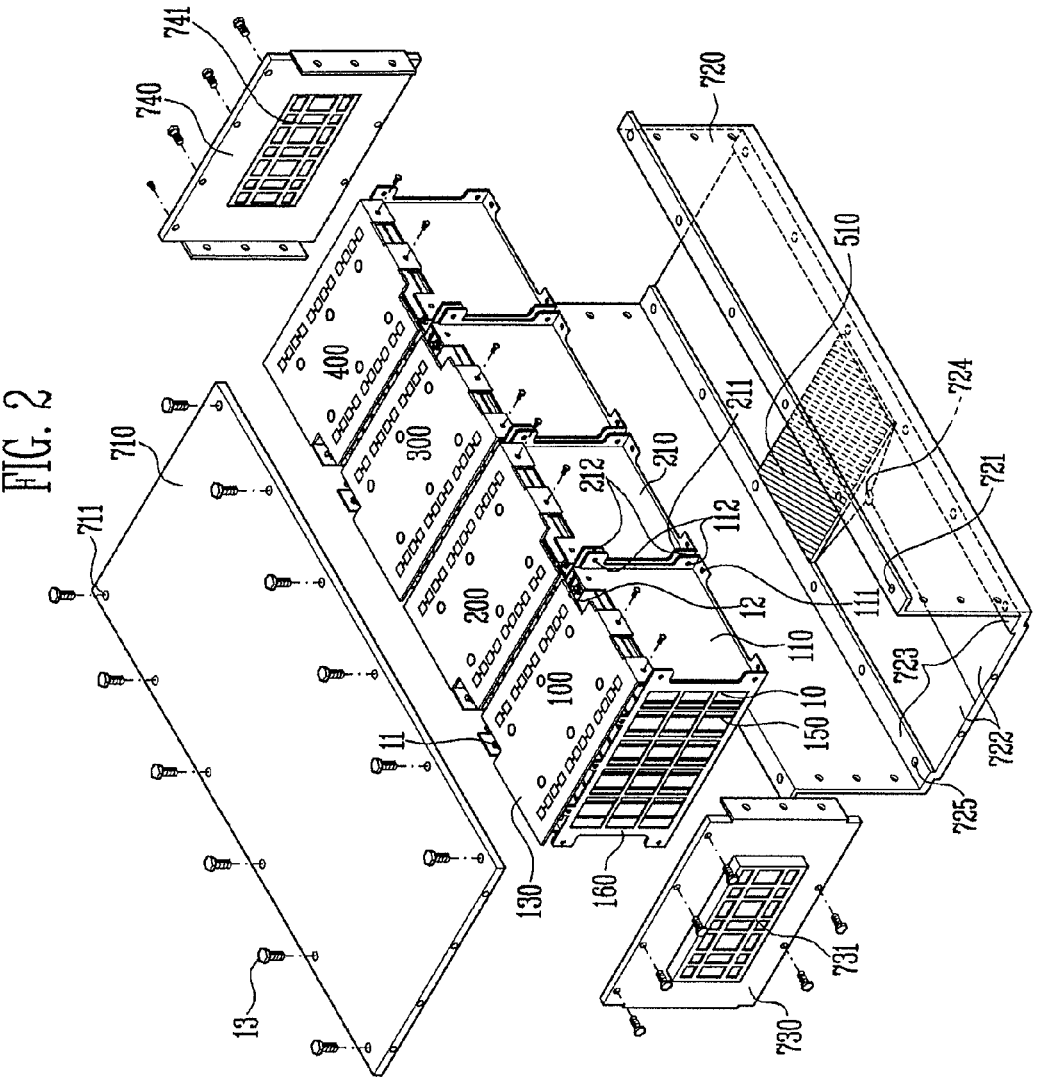
FIG. 2 is an exploded perspective view showing a battery pack according to the first embodiment of the present invention.

FIG. 1 is a perspective view showing a battery pack according to a first embodiment of the present invention and FIG. 2 is an exploded perspective view showing a battery pack according to the first embodiment of the present invention.

Referring to FIGS. 1 and 2, a battery pack according to the present embodiment includes at least one battery module in which a plurality of battery cells are arranged in one direction; and a housing surrounding the battery module, forming an air inlet port at one side surface thereof and forming an air discharging port at other side surface thereof facing the one side surface. A slope portion gradually inclined downwardly from an air inlet port side to an air discharging port is formed at a bottom surface of the housing. The slope may be inclined downwardly from the air inlet port to the center of the direction perpendicular to the direction in the air discharging port side.

A cushioning member may be included between the bottom surface of the housing and the battery module.

In addition, the slope portion and a first hole may formed to direct fluid from the air inlet port side to the air discharging portion side prior to formation of the cushioning member.

The bottom surface of the housing contacting the battery module may include a module supporting portion. A fastening hole for fastening the battery module may be formed at the module supporting portion.

In addition, an opening and closing means, such as a valve, may be formed at a first hole.

A pressure sensing section for controlling the operation of the opening and closing means may be located around the first hole according to the pressure to be applied.

Each configuration of the battery module 100 of the present invention will be described below.

The battery module 100 according to the present invention includes a plurality of battery cells connected together to provide high power. Such a battery module can include each a plurality of battery cells 10 stacked together in one direction. Each battery cell 10 includes a battery case provided with an opening portion, and a cap plate for sealing the opening portion. An electrical case includes cathode plate and anode plate and a separator located between the plates.

In addition, the cap plate has a cathode terminal 11 connected with the cathode plate and an anode terminal 12 connected with the anode plate, wherein both terminals protrude outwardly.

The cathode plate and the anode plate react with electrolyte to generate energy and the energy is transferred to the outside through the cathode terminal 11 and the anode terminal 12. The cathode terminal 11 and the anode terminal 12 of two adjacent battery cells 10 may be electrically connected through a bus bar made of nickel.

In addition, a vent is provided between the cathode terminal 11 and the anode terminal 12. When a gas pressure generated within the battery cell 10 is greater than a predetermined pressure, the vent serves as a pathway through which gas is discharged from the battery cell 10. This can prevent the battery cell to be damaged due to an internal pressure thereof.

The battery cell 10 has a wide front surface arranged side by side to be opposite each other, wherein the center portion of a plurality of battery cells 10 is provided with the vent. This enables the vent to be aligned with an upper surface of the plurality of battery cells 10 arranged in one direction.

In addition, a barrier 150 is located between adjacent battery cells 10. The barrier 150 provides a space between the battery cells 10 to provide a pathway through which a cooling medium can pass.

A top cover 130 is assembled and mounted on the upper side corresponding to the vent portion in which the vent is formed.

Such a top cover 130 may be formed to cover only the vent portion and may be formed to extend to a terminal portion as the embodiment of the present invention. In this case, a plurality of terminal holes are formed at top cover 130 corresponding to the terminal portion. In addition, the terminal cover 160 is located on the upper portion of the cover 130 positioned at the area corresponding to the terminal portion.

Gas generated as a by-product of electrolyte and a pole plate is discharged through the vent as a charge/discharge of the battery cell 10 is performed. After this, gas is securely discharged through the vent portion of the top cover 130 of the battery module 100.

In this case, gas discharged through a protruding hole formed at the top cover 130 is exhausted to a degassing member via a connecting member. The degassing area is separated for each battery module to improve the safety of the battery module 100.

A sensing member for sensing the state of the battery cell 10 is formed at the upper surface of the top cover 130 and the terminal cover 160. As described above, a sensing member is formed for each module.

In addition, a pair of end plates 110 are located at outermost both sides of the battery 100. That is, the pair of end plates 110 are located to make surface contact with the outermost battery cells 10 to pressurize the plurality of the inner side of the battery cells.

In addition, the top plate 130 is located at the upper portion of the plurality of battery cell 10, the side plate 120 is located at side surface thereof and the bottom plate 140 is located at the bottom surface thereof. The end plate 110, the top cover 130, the bottom plate 140 and the side plate 120 serve as the housing of the battery module 100.

A fastening hole is formed at an area contacting the cover 130 and the side plate 120 or the bottom plate 140 and the side plate 120 to fasten each other together.

The fastener member is fastened to the fastening hole and the top cover 130 and the side plate 120 or to the bottom plate 140 and the side plate 120 to fix them together.

In addition, the fastening hole fastened to the top cover 130 and the side plate 120 is formed at the pair of end plate 110. A fastener member is inserted through the fastening hole formed at the upper portion of the pair of end plates 110 and the pair of end plates 110 is fasten to the top cover 130.

In addition, the side portion of the pair of end plates 110 is bent perpendicular to the opposite side of the battery cell 10 and the fastening hole for fastening to the side plate 120 is formed at the perpendicularly bent area.

A fastener member is inserted through the fastening hole to fasten each of the pair of end plates 110 and the side plate 120 together.

The lower portion of end plate 110 is bent perpendicular to the opposite direction of the battery cell 10 so that the battery module 100 includes the bottom fastener portion horizontally formed with the bottom surface to be mounted to the module 100.

In this way, the bottom fastener portion of the battery module 100 may be fixed to the bottom surface in which the battery is mounted by the fastener member. Herein, the fastener member may include a bolt or a stud.

Figure 3A:
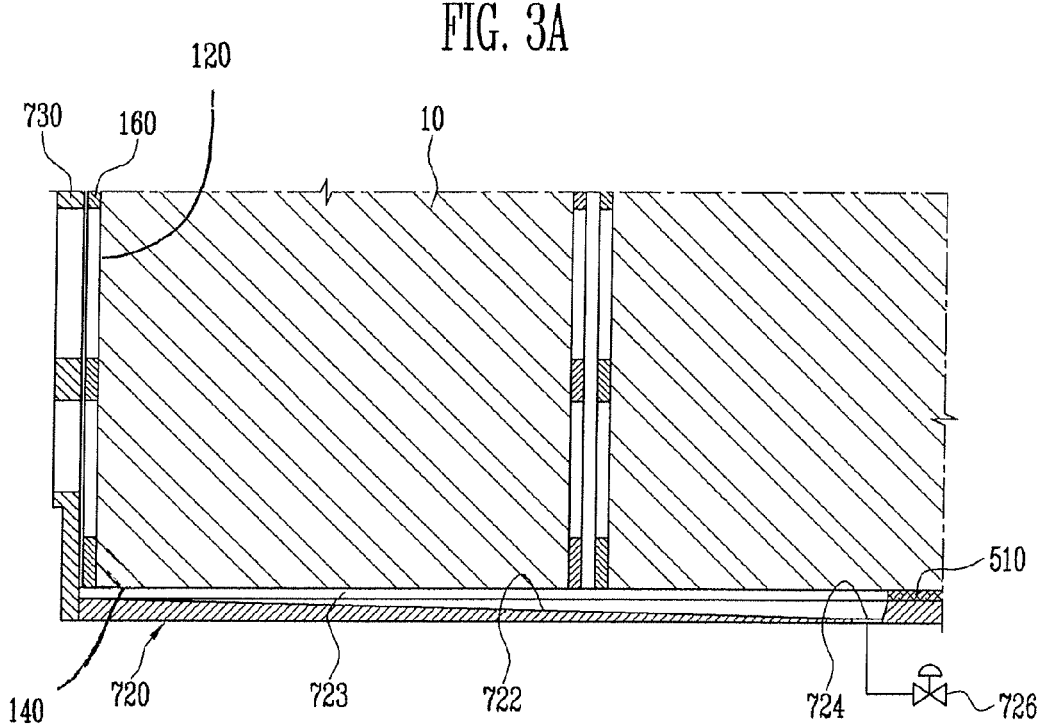
FIG. 3A is a cross-sectional view taken along A-A' of FIG. 1.
Figure 3B:
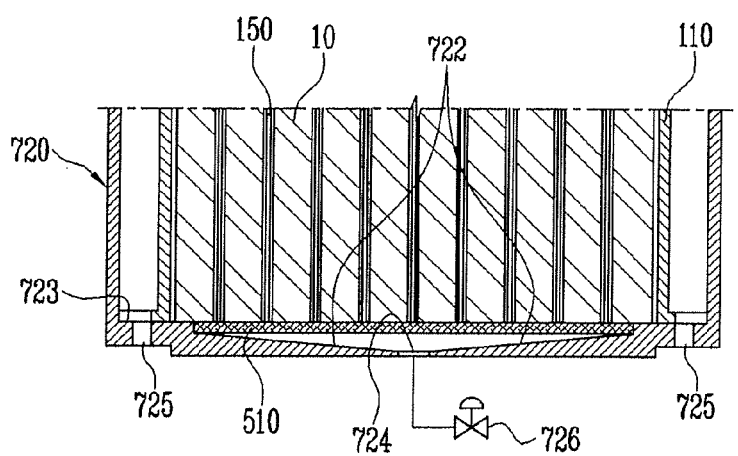
FIG. 3B is a cross-sectional view taken along B-B' of FIG. 1.

Referring also to FIGS. 3A and 3B, the bottom surface of the housing forms a slope portion 722 gradually inclined downwardly from the side of air inlet port 731 to the side of the air discharging port 741.

In addition, a first hole 724 is formed at the end of the slope 722. As such, even if air having high humidity flows into the air inlet 731 and generates water, the water is naturally discharged into the first hole 724 along the slope 722.

In one embodiment, the cushioning member 510 is formed between the bottom surface of the housing and the battery module 100, 200, 300 and 400. The slope portion 722 and the first hole 724 may be formed before the cushioning member 510 is formed.

Referring to FIG. 3B, the housing of the slope portion 722 is inclined to be gradually sloped downward from the air inlet port 731 to the air discharging port 741, and simultaneously may be formed to be gradually sloped downward from either end of the battery modules 100, 2000, 300 and 400 to the center. This enables the water to be discharged from the both ends of the battery module 100, 200, 300 and 400 located prior to the cushioning member 510 being formed.

Figure 4:
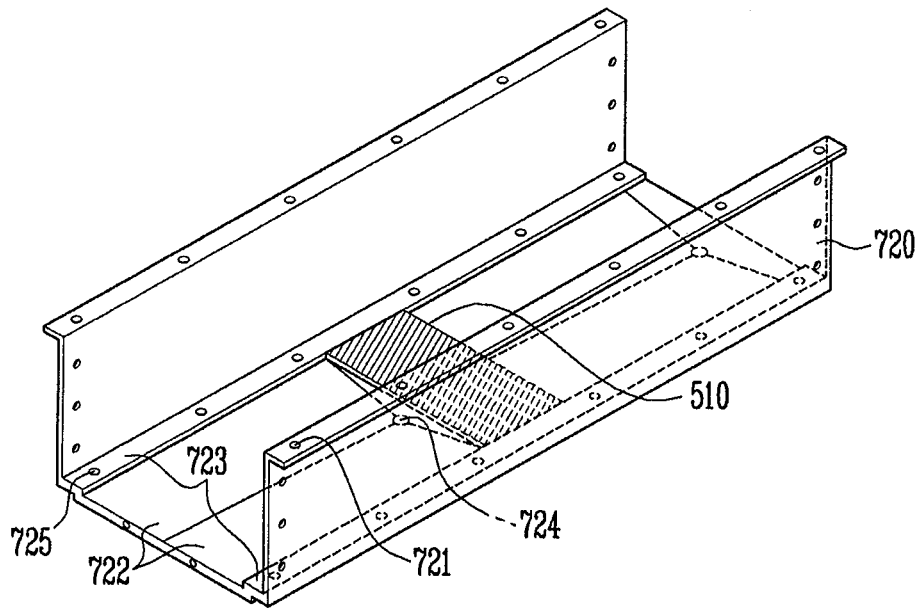
FIG. 4 is a perspective view showing a lower housing according to a second embodiment of the present invention.

FIG. 4 is a perspective view showing the lower housing according to a second embodiment of the present invention.

Referring to FIG. 4, the cushioning member 510 is formed in at least one area between the bottom surface of the housing and the battery module 100, 200, 300 and 400. The slope portion 722 and the first hole 724 may be formed in direction from the air inlet port 731 to the air discharging port 741 prior to the cushioning member 510 being formed. This enables water generated by air having high humidity to be discharged prior to the cushioning member 510 being formed.

Figure 5:
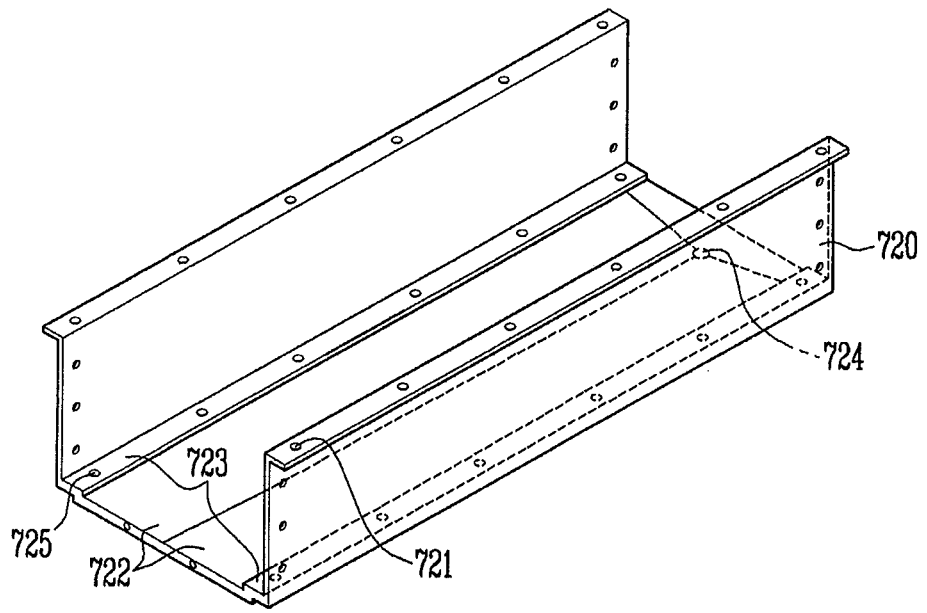
FIG. 5 is a perspective view showing a lower housing according to a third embodiment of the present invention.

FIG. 5 is a perspective view showing a lower housing according to a third embodiment of the present invention.

Referring to FIG. 5, the slope portion 722 formed in the bottom surface of the housing may be formed to extend from the one end of the battery module 100, 200, 300 and 400 in which the air inlet port 731 is formed, to other end of the battery module 100, 200, 300 and 400 in which the air discharging port 741 is formed.

In one embodiment, the first hole 724 for discharging water held in the inner portion of the battery module 100, 200, 300 and 400 is formed at the air discharging port 741.

In this way, humidity introduced within the battery pack enables the water in the air to be easily discharged externally so that the short within the battery pack is prevented, thereby improving the safety.

The battery module according to the embodiment is identical to the configuration of the first embodiment except for a shape of the slope portion 722 of the housing, so the detailed description thereof will be omitted.

Figure 6:
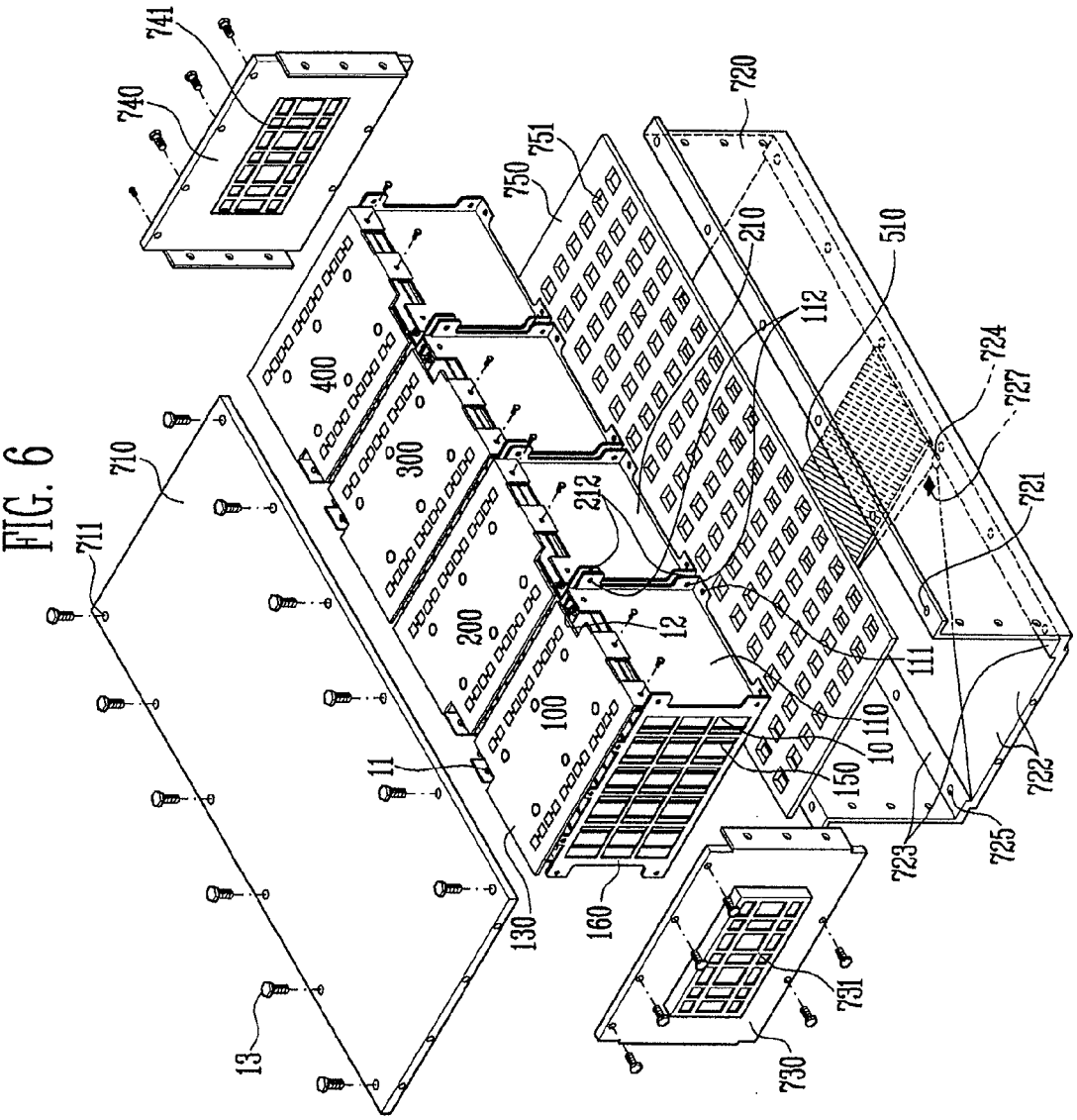
FIG. 6 is an exploded perspective view of a battery pack according to a fourth embodiment of the present invention.

FIG. 6 is an exploded perspective view showing the battery pack according to a fourth embodiment of the present invention.

Referring to FIG. 6, the battery pack according to the present invention includes at least one battery module 100, 200, 300, and 400 in which the plurality of battery cell is arranged, and a housing surrounding the battery module 100, 200, 300 and 400, having the air inlet port 731 at one side surface thereof and having the air discharging port at other side surface opposite to the one side surface.

The slope portion is formed at the bottom surface of the housing and is inclined to be gradually sloped downward from the air inlet port 731 to the air discharging port 741 and the first hole 724 is formed at the end of the slope portion 722.

The slope portion 722 is inclined to be gradually sloped downward toward any one of the ends in a direction perpendicular to a direction from the air inlet port 731 to the air discharging port 741.

A module seating portion 750 that is located substantially horizontally with the ground and on which the battery module 100, 200, 300 and 400 is seated may be formed at the upper side of the bottom surface of the housing. At least one second hole 751 is formed at the module seating portion 750. This enables the battery module 100, 200, 300 and 400 to be tilted thereby improving the safety and the water may be easily discharged into the lower portion thereof by the second hole 751 formed at the module seating portion 750.

Figure 7:
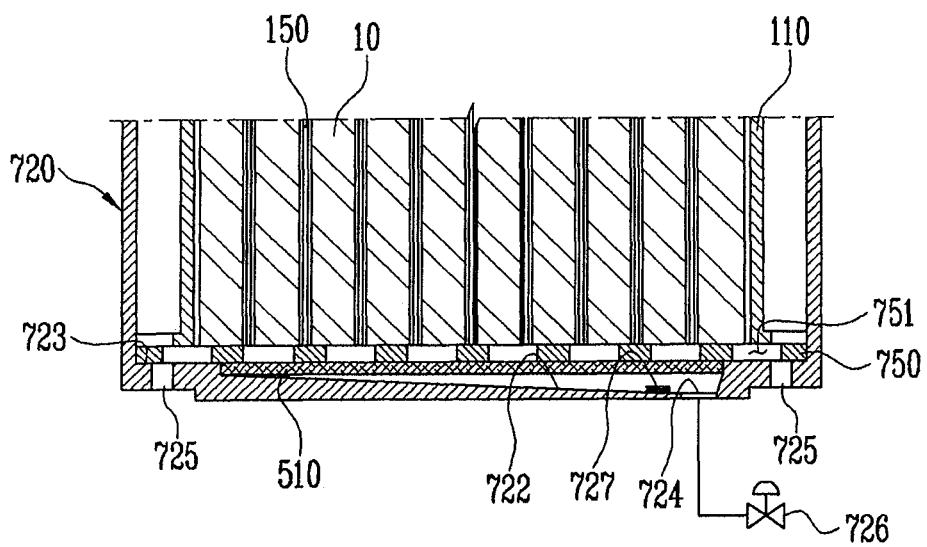
FIG. 7 is a cross-sectional view showing a portion of a battery pack according to the fourth embodiment of the present invention.

FIG. 7 is a vertical cross-section view showing the battery pack according to a fourth embodiment.

Referring to FIG. 7, an opening and closing means 726, such as a valve, may be formed and further includes a pressure sensing portion 727 for controlling an operation of the opening and closing means 726 based on the pressure applied around the first hole 724. When the pressure sensing portion 727 is filled with the water greater than a predetermined pressure, the opening and closing means 726 can be opened. The opening and closing means may be biased to be closed under ordinary operating conditions, thereby keeping the seal of the battery pack.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
   at least one battery module comprising a plurality of battery cells; and
   a housing accommodating the at least one battery module and having an inlet port at a first side thereof and a discharging port at a second side thereof facing the first side, the housing having a bottom surface that has a slope and a first hole at an end of the slope configured to allow a liquid to pass therethrough during operation of the battery pack, wherein the slope directs the liquid towards the first hole and wherein the slope is inclined downward towards the first hole;
   wherein a cushioning member is located between the bottom surface of the housing and the battery module; and
   wherein the slope and the first hole are formed in the direction from the inlet port to the discharging portion prior to formation of the cushioning member.

2. The battery pack of claim 1, wherein the slope is inclined downwardly from the inlet port to the discharging port.

3. The battery pack of claim 1, wherein the slope portion is inclined downwardly from the inlet port and from the discharging port toward an area between the inlet port and the discharging port.

4. The battery pack of claim 1, wherein the slope portion is downwardly sloped towards a longitudinal side of the housing.

5. The battery pack of claim 1, wherein the slope extends from a first end of battery module on which the inlet port is formed to a second end of the battery module on which the discharging port is formed.

6. The battery pack of claim 1, further comprising a module supporting portion between the bottom surface and the at least one battery module.

7. The battery pack of claim 6, wherein a module fastening hole for fastening the at least one battery module is formed on the module supporting portion.

8. The battery pack of claim 1, further comprising a module seating portion between the bottom surface of the housing and the at least one battery module.

9. The battery pack of claim 8, wherein the module seating portion has at least one second hole.

10. The battery pack of claim 1, wherein an opening and closing means is at the first hole.

11. The battery pack of claim 10, wherein a pressure sensing section for controlling the operation of the opening and closing means is at the first hole.

12. The battery pack of claim 10, wherein the opening and closing means comprises a valve.

* * * * *